(12) United States Patent
Kürzinger

(10) Patent No.: US 6,805,884 B2
(45) Date of Patent: Oct. 19, 2004

(54) LONG-TERM FEED FOR AQUATIC ANIMALS

(75) Inventor: Hübert Kürzinger, Melle (DE)

(73) Assignee: Tetra Holding (US), Inc., Blacksburg, VA (US)

( * ) Notice: Subject to any disclaimer, the term of this patent is extended or adjusted under 35 U.S.C. 154(b) by 208 days.

(21) Appl. No.: 10/271,822

(22) Filed: Oct. 15, 2002

(65) Prior Publication Data

US 2003/0091688 A1 May 15, 2003

Related U.S. Application Data

(63) Continuation of application No. 10/007,369, filed on Nov. 5, 2001, now abandoned, which is a continuation of application No. 08/529,821, filed on Sep. 18, 1995, now abandoned, which is a continuation of application No. PCT/EP94/00879, filed on Mar. 21, 1994.

(51) Int. Cl.[7] .............................. A23L 1/05; A23K 1/18
(52) U.S. Cl. ............................. 426/2; 426/49; 426/573; 426/805
(58) Field of Search .............................. 426/2, 29, 573, 426/805, 49

(56) References Cited

U.S. PATENT DOCUMENTS

| | | | |
|---|---|---|---|
| 3,361,114 A | | 1/1968 | Axelrod .................. 119/51.03 |
| 3,591,389 A | | 7/1971 | Schneider .................. 426/271 |
| 3,796,812 A | | 3/1974 | Baensch ...................... 426/62 |
| 3,889,007 A | * | 6/1975 | Gunter et al. ................. 426/74 |
| 4,463,018 A | * | 7/1984 | Carr ............................... 426/1 |
| 4,853,242 A | * | 8/1989 | Poeppinghausen .......... 426/516 |
| 4,935,250 A | * | 6/1990 | Cox ............................ 426/94 |
| 5,089,277 A | | 2/1992 | Prochnow ....................... 426/1 |
| 5,197,219 A | * | 3/1993 | Cook, Jr. et al. ............... 43/42 |

FOREIGN PATENT DOCUMENTS

| | | |
|---|---|---|
| DE | 959 246 | 2/1957 |
| DE | 19 58 253 | 5/1971 |
| DE | 20 63 814 | 7/1972 |
| DE | 84 16 152 | 11/1985 |
| DE | 37 07 032 | 9/1988 |
| EP | 0689388 | * 3/1996 |
| JP | 60-153764 | 8/1985 |
| JP | 63-267245 | 11/1988 |
| JP | 4-117243 | 4/1992 |
| WO | WO 87/01587 | 3/1987 |
| WO | 9421139 | * 9/1994 |

OTHER PUBLICATIONS

Culley, "Prepared and cultivated feeds for animals in zoological gardens", Abstract of Papers of the Annual Meeting, American Association of Zoo Veterinarians 1984, Louisville, Kentucky, USA pp. 50–51.

Heinen, "Evaluation of some binding agents for crustacean diets", Progressive Fish Culturist, vol. 43, No. 3, 1981, pp. 142–145.

* cited by examiner

*Primary Examiner*—C. Sayala
(74) *Attorney, Agent, or Firm*—Merchant & Gould, P.C.

(57) ABSTRACT

The present invention provides a long-term feed for aquatic animals, especially for fish, shrimp and invertebrates, which feed is stable for a long time, is insoluble and does not load the water chemistry in fresh and sea water and can also be used as a weekend or holiday feed for warm and cold water ornamental fish, wherein it contains 1 to 50% by weight of agar-agar.

6 Claims, No Drawings

LONG-TERM FEED FOR AQUATIC ANIMALS

This application is a continuation of U.S. Ser. No. 10/007,369 filed Nov. 5, 2001, now abandoned, which application is a continuation of U.S. Ser. No. 08/529,821 filed Sep. 18, 1995, now abandoned, which application is a continuation of PCT/EP 94/00879 of Mar. 21, 1994, which application claims priority to German Patent Application No. 4309104.0 filed Mar. 22, 1993.

FIELD OF THE INVENTION

The present invention is concerned with a long-term feed for aquatic animals and especially for fish, shrimp and invertebrates, wherein the feed is stable for an extended time in fresh and sea water and can also be used as weekend and holiday feed for ornamental fish.

BACKGROUND OF THE INVENTION

Long-term feeds for ornamental fish, i.e., so-called feed blocks or feed stones, are known which have only a very small proportion of organic materials and mainly consist of calcium sulphate. DE 37 07 032 discloses a holiday feed which overcomes the long-term stabilization problems of the calcium sulphate feed blocks through the use of cement and crude rubber. A disadvantage thereof is the fact that the last-mentioned necessary additive materials are almost indigestable for aquatic animals and, in many countries, are not permitted according to the foodstuff laws.

SUMMARY OF THE INVENTION

It is an object of the present invention to provide an industrially producable, long-term feed for aquatic animals and especially for fish, shrimps and invertebrates, which feed is stable for an extended time and continuously provides ornamental fish with nutrients. The feed of the present invention can be used in fresh and sea water and is especially useful for warm and cold water ornamental fish without thereby making use of adjuvant materials which are not permitted in certain countries according to food-stuff laws but at the same time, however, does not impair the quality of aquarium water due to other adjuvant materials.

Surprisingly, we have now found that, by means of the use of polysaccharides, for example of plant gums, the use of cement, calcium sulphate and/or latex can be avoided in the preparation of the feed. Additional properties which are substantially improved in comparison with the feeding agents described in DE 37 07 032 are also included in the present invention Thus, according to the present invention, there is provided a long-term feed for aquatic animals, especially fish, shrimps and invertebrates in fresh and sea water. The feed is stable for an extended time., is insoluble, does not load the water chemistry in fresh and sea water and can also be used as a weekend or holiday feed for warm and cold water ornamental fish. The feed contains 1 to 50% by weight of a plant gum, preferred agar-agar. Preferred is a feed for ornamental fish which contains 1–10% plant gum, most preferred 2.9%. Typical plant gums which may be used are, for example, carrageenan, agar-agar, gum arabic, tragacanth, karaya gum, ghatti gum, carob bean meal, tara gum and/or xanthans. Preferably, the plant gum is agar-agar.

DETAILED DESCRIPTION

The novel long-term feed for ornamental fish of the present invention is characterised by the omission of natural rubber and cement, by use of additive materials which conform to the foodstuff laws, by the production by means of optimised extrusion parameters, increased production capacity, improved optical and physical properties, increased water stability and reduced water loading. In addition, a reduction of the moisture content in the feed according to the present invention provides further positive properties with regard to water stability and, in particular, with regard to binding action. Further, the raw materials are highly digestable for fish.

The formulation of the long-term feed comprises many different raw materials. Plant gums, such as carrageenan, agar-agar, gum arabic, tragacanth, karaya gum, ghatti gum, carob bean meal, tara gum and/or xanthans may be employed in the present invention. Preferably agar-agar, a gelling agent belonging to the hydrocolloid group of materials which is produced from marine algae, is favourable for the water stability of the feed sticks, as well as for holding together the particles. Agar-agar is a dried, hydrophilic colloidal substance made of giant molecules which have a linear, filamentary construction and consist, in particular, of galactose. For the production, some kinds of red algae are used, namely, Gelidium and Gracellaria. The hydrocolloid is not soluble in cold water but at higher temperatures is practically completely soluble. The melting point lies at about 95–98° C. and the gelling point at about 35–40° C. with the formation of a strong, clear, thermo-reversible gel which only melts again at temperatures above 85° C.

The long-term feed according to the present invention is preferably produced by means of a boiling extruder from the conventional feed pre-mixtures and the polysaccharide, as well as possibly conventional vitamins, minerals, colouring materials, aroma materials, luring agents and preserving agents.

A feed pre-mixture is preferred which consists of about 15 to 35% by weight bolus alba, about 15 to 35% by weight wheat gum, about 5 to 25% by weight lucerne green meal, about 5 to 20% by weight casein, about 5 to 20% by weight krill, about 1 to 10% soya oil, about 1 to 10% by weight milk protein, about 1 to 10% by weight agar-agar, as well as optionally vitamin and mineral material pre-mixtures, conventional colouring materials and/or aroma or luring materials and preserving agents. The material is extruded with the help of a twin-screw boiling extruder at an extruder screw speed of rotation of about 50 to 300 r.p.m. and at a temperature in the meal introduction region in the range of 40 to 160° C. and in the nozzle head in the range of 40 to 180° C. with the addition of about 10 to 50 liters of water and/or of about, 1 to 30 kg of steam per hour at a throughput capacity of about 80 to 1500 kg/hour to give extrudates in the range of from 5 to 50 mm length and with a stick diameter about 2 to 20 mm.

A mixture is quite especially preferred of about 22.2% by weight bolus alba, about 22.0% by weight wheat gum, about 14.5% by weight lucerne green meal, about 12.1% by weight casein, about 9.7% by weight krill, about 4.8% by weight soya oil, about 4.0% by weight milk protein and about 2.9% by weight agar-agar, which optionally contains vitamin and mineral material pre-mixtures, conventional colouring materials and/or aroma or luring materials and/or preserving agents. The mixture is extruded at an extruder screw speed of rotation of about 100 r.p.m. and with a temperature in the range of 80° C. in the meal introduction region and in the range of 85° C. in the nozzle head with the addition of about 31 liters of water per hour to give extrudates from 20 to 25 mm length and with a stick diameter of from 6 to 8 mm.

The analytical composition of the long-term feed according to the present invention is in the range of from 20 to 60% by weight of raw protein, about 2 to 20% by weight of raw fat, about 20 to 40% by weight of raw ash and about 10 to 30% by weight of hydrochloric acid-insoluble ash, with a moisture content of 1 to 20% by weight. In a preferred form the feed contains about 38% by weight of protein, about 6% by weight of raw fat, about 32% by weight of raw ash and about 17% by weight of hydrochloric acid-insoluble ash, with a residual moisture content of about 3% by weight. As preserving agent, there is usually employed ethoxyquin, calcium propionate or citric acid.

By means of the formulation and extrusion parameters according to the present invention, the output capacity of the boiling extruder of about 90 kg in the case of the known holiday feeds is increased to about 140 kg per hour. In comparison with the known holiday feeds, the feed sticks obtained by the process according to the present invention are uniformly shaped, have a smooth surface and good cut surfaces, i.e. the optical appearance is clearly improved and they have a very good water stability and, in-contradistinction to known holiday feeds, show no fungus formation on the feed surface even after a comparatively long period of time under water. When the feed comes into contact with water it softens immediately and swells to nearly double size, but finally keeps its geometrical shape and does not disintegrate. In contrast, the feed known from DE 37 07 032 is instable in its geometrical shape and disintegrates into small particles after entrance into the fish keeping water quite quickly wherefrom the higher water loading results as mentioned below.

In the case of feeding with the sticks, the water loading in aquaria is distinctly lower in comparison with the known formulations. Increased ammonium values cannot be measured and the nitrite contents are greatly reduced. In the case of an average fish occupancy of 18 fish in a 30 liter capacity aquarium, according to conventional feed experiments 1 or 2 of the feed sticks according to the present invention suffice as feed for about one week. In the case of a biologically satisfactorily operating active filter system with foamed material cartridges, in the case of these feeding experiments, only 0.2 mg/l of nitrite and 0.05 mg/l of ammonia are reached as maximum harmful material concentrations. The holiday feed of DE 37 07 032 in comparison gives pollutant concentrations of 0.5 mg/l of nitrite and 0.2 mg/l ammonia.

The inventive feed sticks are relatively big with regard to the relatively small ornamental fish. The offered feed sticks therefore cannot be eaten as a whole and the fish may bite off small particles as needed. For this reason supply with feed for several days is possible in the aquarium. For this special kind of feed uptake the feed must soften and swell immediately in water but must not disintegrate. Preferably the feed is applied in a foil bags with holes which may be fastened with suction cups in different positions on the inner walls of aquarias. Warm and cold water ornamental fish from fresh and sea water can take up feed as needed over a period of up to ten days directly through the perforation of the bags. Simultaneously, the feed is a long term feed and the foil bag is a stock container. One to six feed sticks may be placed in a foil bag. This method of feed application is highly accepted by the different species of fish.

I claim:

1. A feed for aquatic animals comprising about 1–50% by weight of agar-agar and a moisture content of about 1–20% by weight, wherein said feed has a smooth surface, is stable for a long time, is insoluble and useful as a weekend or holiday feed for warm and cold water fish, and wherein the feed softens and swells immediately upon contact with water.

2. A feed according to claim 1, wherein the feed contains in the range 1–10% by weight of agar-agar.

3. A feed according to claim 1, wherein the feed contains about 2.9% by weight of agar-agar and has a moisture content of about 3% by weight.

4. A process for the production of the long term fish feed for weekend and holiday feed of claim 1 wherein a mixture of about 15 to 35% by weight of bolus alba, about 15 to 35% by weight wheat gum, about 5 to 25% by weight Lucerne peen meal, about 5 to 20% by weight casein, about 5 to 20% by weight krill, about 1 to 10% by weight soya oil, about 1 to 10% by weight milk protein, about 1 to 10% by weight agar-agar and vitamin and mineral material pre-mixtures, conventional coloring materials and/or aroma and luring materials and preserving agents is extended with the use of a twin-screw boiling extruder at an extruder screw speed of rotation of about 50 to 300 r.p.m. and at a temperature in the meal introduction region of about 40 to 160 0° C. and in the nozzle head of about 40– to 180° C. with the addition of about 10 to 50 liters of water and/or about 1 to 30 kg of steam per hour at a throughput capacity of about 80 to 1500 kg/hour to give extrudates of about 5 to 50 mm length, with a stick diameter of about 2 to 20 mm and a moisture content of about 1–20% by weight.

5. A process for the production of fish feed of claim 4, wherein a mixture of about 22.2% by weight bolus alba, about 22.0% by weight wheat gum, about 14.5% by weight lucerne green meal, about 12.1% by weight casein, about 9.7% by weight krill, about 4.8% by weight soya oil, about 4.0% by weight milk protein, about 2.9% by weight agar-agar and vitamin and mineral material premixtures, conventional colouring materials and/or aroma or luring materials and/or preserving agents is extruded with the help of a twin-screw boiling extruder at an extruder screw speed of rotation of about 100 r.p.m. and at a temperature in the meal introduction region of about 80° C. and in the nozzle head of about 85° C. with the addition of about 31 liters of water per hour to give extrudates in the range of from 20 to 24 mm length, with a stick diameter in the range of from 6 to 8 mm and a moisture content of about 3% by weight.

6. A method of feeding cold and warm water fish in fresh and sea water comprising application of feed sticks containing the feed of claim 1 in said water as weekend and holiday feed, where the feed is stable for a long period of time.

* * * * *